(12) United States Patent
Gervasi et al.

(10) Patent No.: US 8,260,184 B2
(45) Date of Patent: Sep. 4, 2012

(54) HYPER NANOCOMPOSITES (HNC) FOR FUSER MATERIALS

(75) Inventors: David J. Gervasi, Pittsford, NY (US); Santokh Badesha, Pittsford, NY (US); Alan R. Kuntz, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 467 days.

(21) Appl. No.: 12/610,513

(22) Filed: Nov. 2, 2009

(65) Prior Publication Data

US 2011/0103854 A1 May 5, 2011

(51) Int. Cl.
*G03G 15/20* (2006.01)
(52) U.S. Cl. .................................. 399/333; 399/329
(58) Field of Classification Search ................. 399/333, 399/330, 329
See application file for complete search history.

(56) References Cited

U.S. PATENT DOCUMENTS

| | | | |
|---|---|---|---|
| 5,595,823 A * | 1/1997 | Chen et al. | |
| 5,846,643 A | 12/1998 | Badesha et al. | |
| 6,384,172 B1 * | 5/2002 | Dvornic et al. | |
| 6,646,089 B2 | 11/2003 | Dvornic et al. | |
| 6,995,215 B2 | 2/2006 | Dvornic et al. | |
| 7,302,220 B2 * | 11/2007 | Chen et al. | 399/333 |
| 2006/0188300 A1 * | 8/2006 | Matsunaka et al. | 399/333 |
| 2006/0263532 A1 * | 11/2006 | Kaplan et al. | 399/333 |
| 2006/0263533 A1 * | 11/2006 | Kaplan et al. | 399/333 |
| 2006/0275063 A1 * | 12/2006 | Blair et al. | 399/333 |
| 2006/0292360 A1 * | 12/2006 | Hays et al. | |
| 2007/0009682 A1 * | 1/2007 | Gervasi et al. | |
| 2009/0233085 A1 * | 9/2009 | Gervasi et al. | |
| 2010/0104332 A1 * | 4/2010 | Law et al. | |
| 2011/0012074 A1 * | 1/2011 | Sarkar et al. | |

FOREIGN PATENT DOCUMENTS

| | | |
|---|---|---|
| DE | 695 19 004 T2 | 5/2001 |
| DE | 10 2004 057 430 | 6/2006 |
| JP | 58016273 A * | 1/1983 |
| JP | 01103976 A * | 4/1989 |
| JP | 2007 304 374 | 11/2007 |

* cited by examiner

*Primary Examiner* — Susan Lee
(74) *Attorney, Agent, or Firm* — MH2 Technology Law Group LLP

(57) ABSTRACT

Provided are fuser members and printing apparatuses including fuser members. The fuser member can include a substrate and a top coat layer including a hyper nanocomposite disposed over the substrate, wherein the hyper nanocomposite can include a plurality of nanoparticles substantially uniformly dispersed in one or more cross-linked hyperbranched polymers selected from the group consisting of polycarbosilane, polycarbosilixane, polycarbosilazene, and polyfluorocarbon.

20 Claims, 3 Drawing Sheets

HYPER NANOCOMPOSITES (HNC) FOR FUSER MATERIALS

DETAILED DESCRIPTION

1. Field of Use

The present teachings relate generally to printing devices and, more particularly, to oil-less or low oil fusing subsystems.

2. Background

Advances in color fusing materials have led to the use of an amine-functional fluid for improved release of toner from the fuser member. One of the significant drawbacks of the use of amine-functional fluid is in post fusing operations, such as bookbinding, laminating, and varnishing. The amine-functionality in the fuser fluid can react with paper surfaces and can remain there, interfering with most post fusing operations. Conventional solutions to this problem include oil removal with the use of detergents, surfactants, etc. as well as secondary treatments of the print post-fusing in order to counteract the deleterious effects of residual fluid.

Thus, there is a need to overcome these and other problems of the prior art and to provide new material compositions that will allow release of the toner from the fuser member without the use of a release fluid or with the use of significantly lower quantities of release fluid.

SUMMARY

In accordance with various embodiments, there is a fuser member. The fuser member can include a substrate and a top coat layer including a hyper nanocomposite disposed over the substrate, wherein the hyper nanocomposite can include a plurality of nanoparticles substantially uniformly dispersed in one or more cross-linked hyperbranched polymers selected from the group consisting of polycarbosilane, polycarbosilixane, polycarbosilazene, and polyfluorocarbon.

According to another embodiment, there is an apparatus for forming an image. The apparatus can include a charging station for uniformly charging a surface of an electrophotographic photoreceptor and an imaging station for forming a latent image on the electrophotographic photoreceptor. The apparatus can also include a developing station for converting the latent image to a toner image on the electrophotographic photoreceptor and a fuser subsystem for fixing the toner image onto a media. The fuser subsystem can include a hyper nanocomposite coating disposed over a substrate, the hyper nanocomposite coating including a plurality of nanoparticles substantially uniformly dispersed in one or more cross-linked hyperbranched polymers selected from the group consisting of polycarbosilane, polycarbosilixane, polycarbosilazene, and polyfluorocarbon.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

In the following description, reference is made to the accompanying drawings that form a part thereof, and which are shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
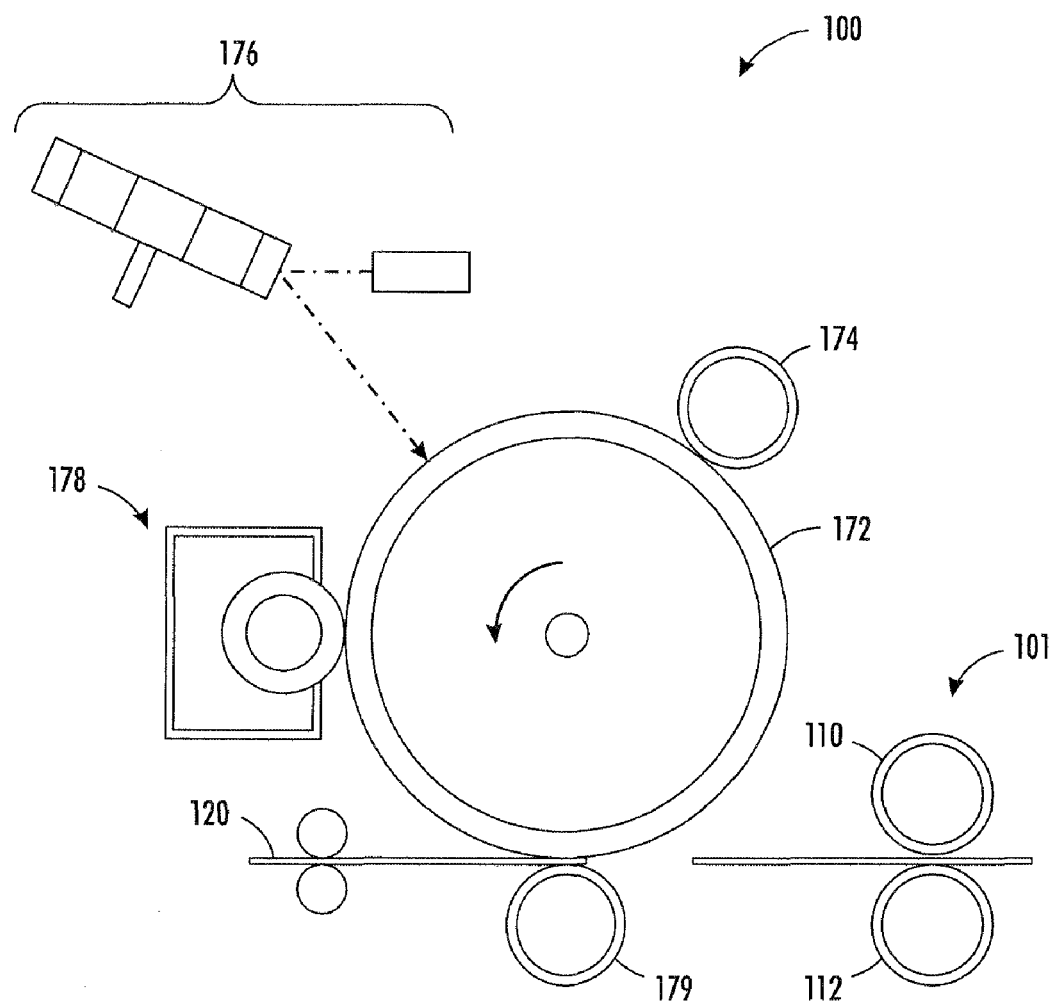
FIG. 1 schematically illustrates an exemplary printing apparatus, according to various embodiments of the present teachings.
Figure 3:
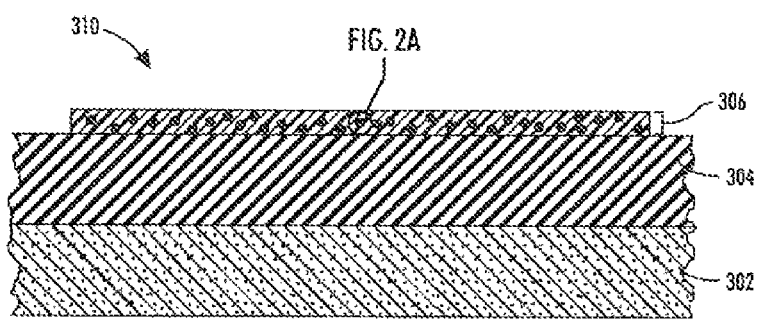
FIG. 3 schematically illustrates a cross section of another exemplary fuser member, according to various embodiments of the present teachings.

FIG. 1 schematically illustrates an exemplary printing apparatus 100. The exemplary printing apparatus 100 can be a xerographic printer and can include an electrophotographic photoreceptor 172 and a charging station 174 for uniformly charging the electrophotographic photoreceptor 172. The electrophotographic photoreceptor 172 can be a drum photoreceptor as shown in FIG. 1 or a belt photoreceptor (not shown). The exemplary printing apparatus 100 can also include an imaging station 176 where an original document (not shown) can be exposed to a light source (also not shown) for forming a latent image on the electrophotographic photoreceptor 172. The exemplary printing apparatus 100 can further include a development subsystem 178 for converting the latent image to a visible image on the electrophotographic photoreceptor 172 and a transfer subsystem 179 for transferring the visible image onto a media 120. The printing apparatus 100 can also include a fuser subsystem 101 for fixing the visible image onto the media 120. The fuser subsystem 101 can include one or more of a fuser member 110, a pressure member 112, oiling subsystems (not shown), and a cleaning web (not shown). In some embodiments, the fuser member 110 can be a fuser roll 110, as shown in FIG. 1. In other embodiments, the fuser member 110 can be a fuser belt 315, as shown in FIG. 3. In various embodiments, the pressure member 112 can be a pressure roll 112, as shown in FIG. 1 or a pressure belt (not shown). In certain embodiments, the fuser subsystem 101 can be at least one of an oil-less fuser subsystem or a low-oil fuser subsystem.

Figure 2:
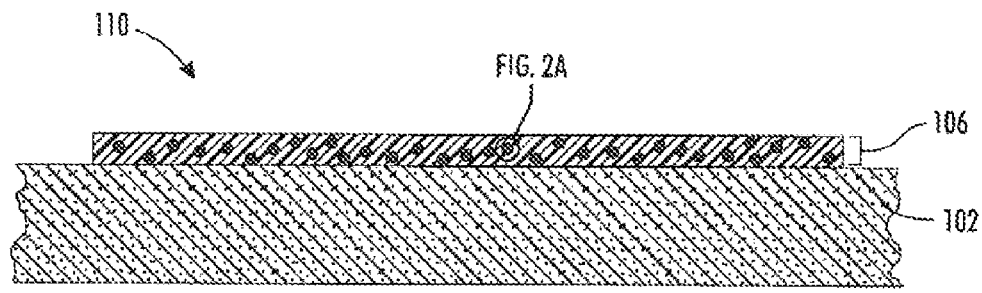
FIG. 2 schematically illustrates a cross section of an exemplary fuser member shown in FIG. 1, according to various embodiments of the present teachings.
Figure 2A:
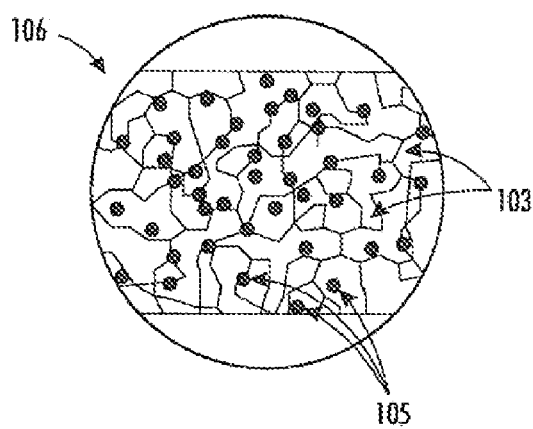
FIG. 2A schematically illustrates an exemplary hyperbranched nanocomposite, according to various embodiments of the present teachings.

FIG. 2 schematically illustrates a cross section of the exemplary fuser member 110, in accordance with various embodiments of the present teachings. As shown in FIG. 2, the exemplary fuser member 110 can include a top coat layer 106 including a hyper nanocomposite disposed over the substrate 102. FIG. 2A is a schematic illustration of an exemplary hyper nanocomposite 106' including a plurality of nanoparticles 105 substantially uniformly dispersed in one or more cross-linked hyperbranched polymers 103. Any suitable cross linkable hyperbranched polymers can be used, including, but not limited to, polycarbosilane, polycarbosilixane, polycarbosilazene, polyfluorocarbon, and copolymers thereof. The cross linkable hyperbranched polymers can be crosslinked using any suitable technique, including, but not limited to, thermal curing, uv curing, e-beam curing, and oxidative curing.

Hyperbranched polymers are macromolecules with a tree-like structure containing more branching than typical linear or branched polymers. Traditional branched polymers have a linear chain with primary or secondary branches attached to a linear polymer chain. The branching in a hyperbranched polymer is intermediate between pure dendrimers and traditional branched polymers. The polymerizaton for these types of hyperbranched polymers is a straightforward Ax+By polymerization, which has advantages in monomer availability, wide range of terminal end group choice and improved control over the reaction. U.S. Pat. Nos. 6,384,172; 6,646,089; 6,812,298; and 6,995,215 discloses synthesis of a variety of hyperbranched polymers, the disclosures of which are incorporated by reference herein in their entirety.

Referring back to FIG. 2A, the plurality of nanoparticles 105 can be physically or chemically bonded to the one or more cross linked hyperbranched polymers 103. In some embodiments, the plurality of nanoparticles 105 can be physically compounded with the one or more cross linkable hyperbranched polymers before cross linking the hyperbranched polymers. In various embodiments, the plurality of nanoparticles 105 can be present in an amount ranging from about 0.5% to about 50% by weight of the total solid weight of the hyper nanocomposite 106' composition, or from about 3% to about 30%, or from about 3% to about 15%. Each of the plurality of nanoparticles 105 can have at least one dimension in the range of about 1 nm to about 500 nm, and in some cases in the range of about 2 nm to about 100 nm, and in other cases in the range of about 5 nm to about 50 nm. In various embodiments, the plurality of nanoparticles 105 can include one or more of a plurality of nanoparticles, a plurality of nanotubes, and a plurality of nanoplatelets. Exemplary nanoparticles 105 can include, but are not limited to, one or more of graphene, carbon, aluminum oxide, aluminum nitride, silicon dioxide, silicon carbide, silicon nitride, copper, single wall carbon nanotubes, and multi-wall carbon nanotubes.

The disclosed top coat layer 106 including hyper nanocomposites (HNC) 106' has improved physical, chemical, thermal, and/or electrical properties at temperatures in the range of about 70° C. to about 300° C. In general, hyperbranched polymers are well-known for having improved mechanical, rheological, and processing properties. Further addition of nanoparticles 105 to the cross linkable hyperbranched polymers 103 can provide additional manipulation of the physical, electrical, thermal, and/or release properties of the resulting hyper nanocomposite 106'. For example, nanoparticles, such as, carbon nanotubes, graphene, and carbon can impart their electrical conductivity to the hyper nanocomposite 106'. Therefore, the hyper nanocomposite 106' besides being mechanically strong, can be electrically conductive and can dissipate electrostatic charges. Furthermore, carbon nanotubes, graphene, carbon, aluminum nitride, aluminum oxide, or boron nitride can increase the thermal conductivity of the hyper nanocomposite 106'. In various embodiments, the hyper nanocomposite 106' can have a thermal conductivity in the range of about 0.1 W/m-K to about 1.5 W/m-K, in some cases from about 0.1 W/m-K to about 1.2 W/m-K, and in other cases from about 0.5 W/m-K to about 1 W/m-K. The carbon nanotubes can have a diameter from about 0.5 nm to about 20 nm, or from about 1 nm to about 19 nm, or from about 1 nm to about 18 nm and a length from about 0.1 μm to a few mm, or from about 0.2 μm to about 100 μm, or from about 0.2 to about 10 μm. Graphene particles can have a thickness from about 5 nm to about 100 nm, or from about 8 nm to about 90 nm, or from about 10 nm to about 80 nm and a width from about 0.5 μm to about 5 μm, or from about 0.8 μm to about 4 μm, or from about 1 μm to about 3 μm. Polyhedral carbon particles can have at least one dimension from about 10 nm to about 500 nm, or from about 15 nm to about 450 nm, or from about 20 nm to about 400 nm. Polyhedral aluminum oxide particles can have at least one dimension from about 30 nm to about 100 nm, or from about 35 nm to about 80 nm, or from about 40 nm to about 75 nm. Aluminum oxide fibers can have a diameter from about 2 nm to about 10 nm, or from about 1 nm to about 9 nm, or from about 1 nm to about 8 nm and a length from about 1 μm to about 10 μm, or from about 1.2 μm to about 9 μm, or from about 2 to about 8 μm.

In another embodiment, addition of nanoparticles such as, for example, nano-sized copper particles can improve the electrical or thermal conductivity of the hyper nanocomposite 106'. The nano-sized copper metal particles can have an average particle diameter of from about 50 to about 1,500 nm, or from about 50 to about 1,000 nm, or from about 50 to about 500 nm, or from about 50 to about 300 nm. In addition, the nano-sized copper metal particles can be in other forms, such as polyhedral or flake form. Copper flakes can have a thickness of from about 5 to about 100 nm, or from about 8 to about 80 nm, and surface length (or width) of from about 0.5 μm to about 5 μm, or from about 0.8 μm to about 4 μm or from about 1 μm to about 3.5 μm. Polyhedral copper particles can have a length from about 5 μm to about 20 μm, or from about 8 μm to about 18 μm, or from about 10 μm to about 15 μm with a thickness from about 50 nm to about 500 nm, or from about 55 nm to about 450 nm, or from about 60 nm to about 350 nm.

In various embodiments, exemplary nanoparticles, such as, aluminum nitride, aluminum oxide, and silicon dioxide can be added to the hyper nanocomposite 106' to improve the mechanical properties, such as, tensile strength, toughness, and ultimate strength of the hyper nanocomposite 106' and hence of the top coat layer 106. In certain embodiments, the hyper nanocomposite 106' can have a tensile strength in the range of about 800 psi to about 2000 psi, or from about 800 psi to about 1800 psi, or from about 1000 psi to about 1500 psi. In various embodiments, the hyper nanocomposite 106' can have a toughness in the range of about 800 in·lbf/in$^3$ to about 3000 in·lbf/in$^3$, or from about 1000 in·lbf/in$^3$ to about 2200 in·lbf/in$^3$, or in some cases from about 1200 in·lbf/in$^3$ to about 2000 in·lbf/in$^3$. In certain embodiments, the hyper nanocomposite 106' can have a % ultimate strain in the range of about 50% to about 400%, or from about 80% to about 350%, or from about 100% to about 300%. Polyhedral aluminum nitride particles can have at least one dimension from about 10 nm to about 500 nm, or from 20 nm to about 450 nm, or from about 50 nm to about 400 nm. Silicon dioxide nanoparticles can have a diameter from about 1 nm to about 100 nm, or from about 2 nm to about 90 nm, or from about 5 nm to about 80 nm.

In various embodiments, the hyper nanocomposite 106' of the top coat layer 106 can also include one or more of fluoroplastics, fluorinated polyorganosilsesquioxane, surface energy enhancing additives to improve the surface release property of the hyper nanocomposite 106' and hence of the top coat layer 106. In some embodiments, the hyper nanocomposite 106' can have a surface energy in the range of about 13 dyne/cm to about 20 dyne/cm, in some cases from about 13 dyne/cm to about 18 dyne/cm, and in other cases from about 13 dyne/cm to about 15 dyne/cm. The nano-sized fluoroplastic or fluorinated polyorganosilsesquioxane particles can have an average particle diameter of from about 10 to about 1,500 nm, or from about 10 to about 1,000 nm, or from about 10 to about 500 nm, or from about 10 to about 300 nm. Exemplary fluoroplastics can include, but are not limited to, TEFLON® like materials such as polytetrafluoroethylene (PTFE), fluorinated ethylenepropylene copolymers (FEP), and perfluorovinylalkylether tetrafluoroethylene copolymers (PFA TEFLON®), such as polyfluoroalkoxypolytetrafluoroethylene, as well as perfluoro(methyl vinyl ether) copolymer resin (PMVE), and perfluoro(ethyl vinyl ether) copolymer resin (PEVE). Any suitable surface energy enhancing additive can be added to the hyper nanocomposite 106', such as, for example, wetting agents, surfactants, silanes, and emulsifiers. Specific examples of surface energy enhancing additive, include, but are not limited to, Novec™ Fluorosurfactants (3M Global Headquarters, St. Paul, Minn.), Zonyl® Fluorosurfactants (DuPont, Wilmington, Del.), and PolyFox® (OMNOVA Solutions inc., Fairlawn, Ohio).

In various embodiments, the hyper nanocomposite 106' of the top coat layer 106 can further include one or more optional additives such as, for example, cross-linking agents and leveling agents. Specific examples of optional additives, include, but are not limited to, biphenyls such as bisphenols including bisphenol AF [2,2-bis(4-hydroxyphenyl)hexafluoropropane] a component of VC-50 from DuPont (Wilmington, Del.) or aminosilanes such as AO700, [3-(2-Aminoethyl)Aminopropyl]Trimethoxysilane from UCT Inc. (Bristol, Pa.).

In various embodiments, the top coat layer 106 can have a thickness from about 50 nm to about 300 μm, or from about 500 nm to about 200 μm, or from about 3 μm to about 80 μm.

FIG. 3 schematically illustrates a cross section of another exemplary fuser member 310. The exemplary fuser member 310 can include a compliant layer 304 disposed over a substrate 302 and a top coat layer 306 including a hyper nanocomposite, for example hyper nanocomposite 106' as shown in FIG. 2A, disposed over the compliant layer 304. In various embodiments, the compliant layer 304 can include at least one of a silicone, a fluorosilicone, or a fluorelastomer. Exemplary materials for the compliant layer 304 can include, but are not limited to, silicone rubbers such as room temperature vulcanization (RTV) silicone rubbers; high temperature vulcanization (HTV) silicone rubbers; and low temperature vulcanization (LTV) silicone rubbers. Exemplary commercially available silicone rubbers include, but are not limited to, SILASTIC® 735 black RTV and SILASTIC® 732 RTV (Dow Corning Corp., Midland, Mich.); and 106 RTV Silicone Rubber and 90 RTV Silicone Rubber (General Electric, Albany, N.Y.). Other suitable silicone materials include, but are not limited to, Sylgard® 182 (Dow Corning Corp., Midland, Mich.); siloxanes (preferably polydimethylsiloxanes); fluorosilicones such as Silicone Rubber 552 (Sampson Coatings, Richmond, Va.); dimethylsilicones; liquid silicone rubbers such as, vinyl crosslinked heat curable rubbers or silanol room temperature crosslinked materials; and the like. In various embodiments, the compliant layer 304 can have a thickness from about 10 μm to about 10 mm, or from about 100 μm to about 9 mm, or from about 3 mm to about 8 mm.

Referring back to the fuser member 110, 310 as shown in FIGS. 2 and 3, the substrate 102, 302 can be a high temperature plastic substrate, such as, for example, polyimide, polyphenylene sulfide, polyamide imide, polyketone, polyphthalamide, polyetheretherketone (PEEK), polyethersulfone, polyetherimide, and polyaryletherketone. In some embodiments, the substrate 102, 302 can be a metal substrate, such as, for example, steel, iron, and aluminum. The substrate 102, 302 can have any suitable shape such as, for example, a cylinder and a belt. The thickness of the substrate 102, 302 in a belt configuration can be from about 25 μm to about 250 μm, or from about 40 μm to about 200 μm, or from about 50 μm to about 125 μm. The thickness of the substrate 102, 302 in a cylinder or a roll configuration can be from about 0.5 mm to about 20 mm, or from about 0.8 mm to about 15 mm, or from about 1 mm to about 10 mm.

In various embodiments, the fuser member 110, 310 as shown in FIGS. 2 and 3 can also include one or more optional adhesive layers (not shown). The optional adhesive layers (not shown) can be disposed between the substrate 302 and the compliant layer 304, and/or between the compliant layer 304 and the top coat layer 306, and/or between the substrate 102 and the top coat layer 106 to ensure that each layer 106, 304, 306 is bonded properly to each other and to meet performance target. Exemplary materials for the optional adhesive layer can include, but are not limited to epoxy resin and polysiloxane, such as, for example, THIXON 403/404 (Rohm and Haas Company, Philadelphia, Pa.), A-1100 (Union Carbide Corp., Danbury, Conn.), TACTIX 740™, TACTIX 741™, and TACTIX 742™ (Huntsman Advanced Materials, The Woodlands, Tex.).

Figure 4:
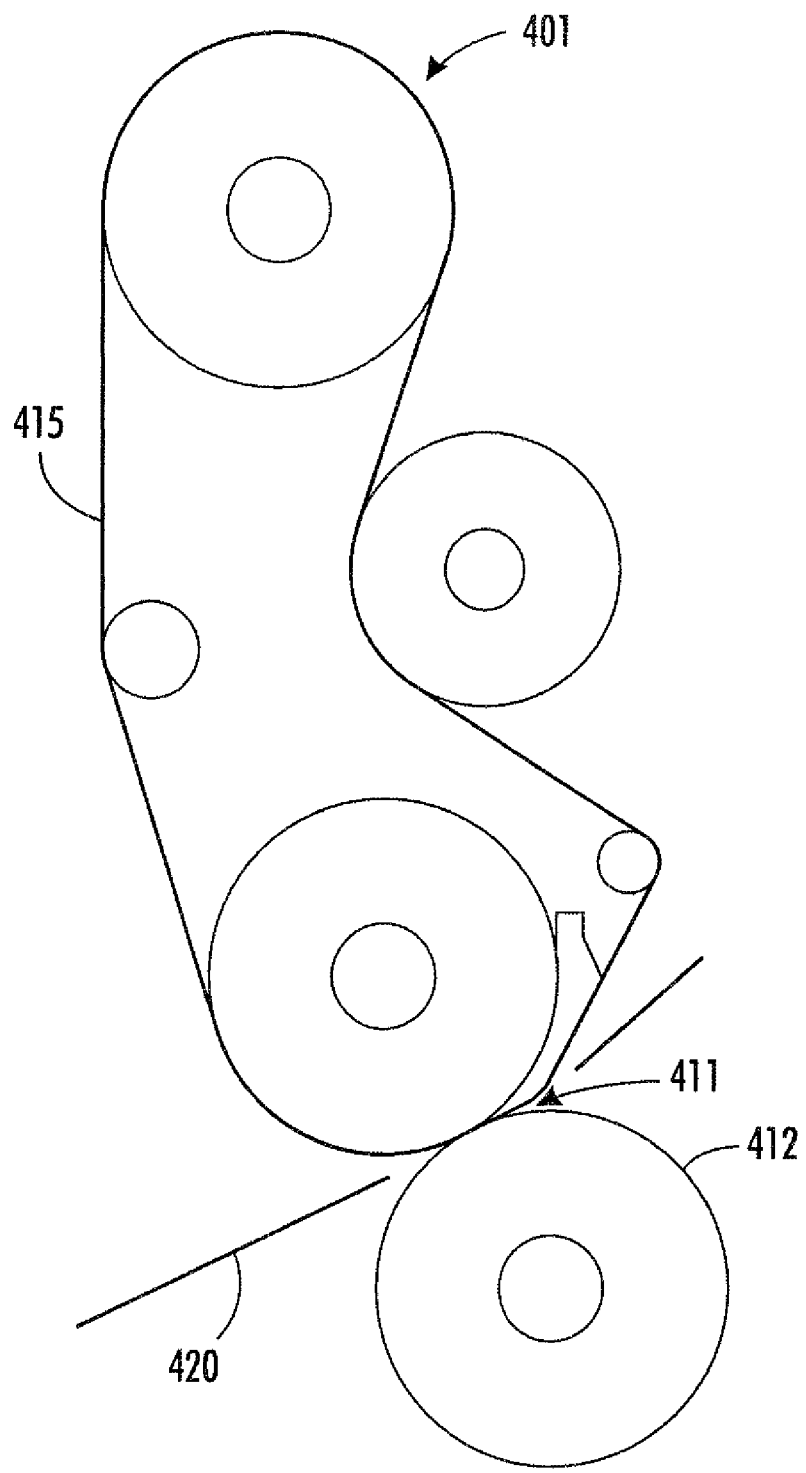
FIG. 4 schematically illustrates an exemplary fuser member of a printing apparatus, according to various embodiments of the present teachings.

FIG. 4 schematically illustrates an exemplary fuser member 401 in a belt configuration of a xerographic printer. The exemplary fuser member 401 can include a fuser belt 415 and a rotatable pressure roll 412 that can be mounted forming a fusing nip 411. In various embodiments, the fuser belt 415 and the pressure roll 412 can include a top coat layer, for example, the top coat layer 106 as shown in FIG. 2 disposed over the substrate 102 or for example, the top coat layer 306 as shown in FIG. 3 disposed over the compliant layer 304. A media 420 carrying an unfused toner image can be fed through the fusing nip 411 for fusing.

In various embodiments, the pressure members 112, 412, as shown in FIGS. 1 and 4 can also have a cross section as shown in FIGS. 2 and 3 of the exemplary fuser member 110, 310.

The disclosed exemplary top coat layer 106, 306 of the fuser member 110, 310, 415 can include hyper nanocomposite 106' including a plurality of nanoparticles 105 substantially uniformly dispersed in one or more cross-linked hyperbranched polymers 103. Furthermore, the exemplary top coat layer 106, 306 combines the mechanical, electrical, and thermal properties of the nanoparticles 105, desired for long life of the fuser members 110, 310, 415. The disclosed top coat layer 106, 306 including the hyper nanocomposite 106' can allow release of the toner from the fuser member 110, 310, 415 without the use of a release fluid or with the use of significantly lower quantities of release fluid. System contamination such as paper debris, toner, toner additives and the reaction products thereof should also be reduced with the use of the hyper nanocomposite 106' in the top coat layer 106, 306 of the fuser member 110, 415 and pressure members 112, 312. Additionally, the top coat layer 106, 306 can be formed using simple techniques, such as, for example, spray coating, dip coating, brush coating, roller coating, spin coating, casting, and flow coating.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Preparation of a Coating Solution

About 100 g of hyperbranched polymer (Michigan Molecular Institute, Midland, Mich.) was dissolved in about 500 ml of hexane. About 30 g of nano-aluminum oxide (Alfa-Aesar, Ward Hill, Mass.), about 10 g of silanol-functionalized PDMS (Gelest Inc., Morrisville, Pa.), and about 5 g Carbon nanotubes (Cheap Tubes, Inc., Brattleboro, Vt.) were added to the hyperbranched polymer solution and mixed via standard physical mixing.

Example 2

Formation of a Fuser Member

The formulation of Example 1 was introduced to a magnetic pumping system and coated onto an aluminum fuser roll with an intermediate silicone layer. The silicone layer was previously prepared for sufficient adhesion of the topcoat (formulation of Example 1). The fuser roller with the topcoat was then cured at about 200° C. for about 16 hours. This fuser roller was then installed in a printing machine.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A fuser member comprising:
   a substrate; and
   a top coat layer comprising a hyper nanocomposite disposed over the substrate, wherein the hyper nanocomposite comprises a plurality of nanoparticles substantially uniformly dispersed in one or more cross-linked hyperbranched polymers selected from the group consisting of polycarbosilane, polycarbosilixane, polycarbosilazene, and polyfluorocarbon, and wherein the hyper nanocomposite has a surface energy in the range of about 13 dyne/cm to about 20 dyne/cm.

2. The fuser member of claim 1, wherein the plurality of nanoparticles comprises a plurality of one or more of graphene, carbon, aluminum oxide, aluminum nitride, silicon dioxide, silicon carbide, silicon nitride, copper, single wall carbon nanotubes, and multi-wall carbon nanotubes.

3. The fuser member of claim 1, wherein each of the plurality of nanoparticles has at least one dimension in the range of about 1 nm to about 500 nm.

4. The fuser member of claim 1, wherein the plurality of nanoparticles are physically or chemically bonded to the one or more cross linked hyperbranched polycarbosilane, polycarbosilixane, polycarbosilazene, polyfluorocarbon, and copolymers thereof.

5. The fuser member of claim 1, wherein the hyper nanocomposite has a surface energy in the range of about 13 dyne/cm to about 18 dyne/cm.

6. The fuser member of claim 1, wherein the hyper nanocomposite has a tensile strength in the range of about 800 psi to about 2000 psi.

7. The fuser member of claim 1, wherein the hyper nanocomposite has a toughness in the range of about 800 in·lbf/in$^3$ to about 3000 in·lbf/in$^3$.

8. The fuser member of claim 1, wherein the hyper nanocomposite has a % ultimate strain in the range of about 50% to about 400%.

9. The fuser member of claim 1, wherein the plurality of nanoparticles are present in an amount ranging from about 0.5% to about 50% by weight of the total solid weight of the hyper nanocomposite.

10. The fuser member of claim 1, wherein the hyper nanocomposite further comprises one or more additives selected from the group consisting of electrically conductive fillers, thermally conductive fillers, thermally stabilizing agents, coloring agents, reinforcing fillers, surfactants, cross-linking agents, leveling agents, and processing aids.

11. The fuser member of claim 1, wherein the hyper nanocomposite further comprises one or more fluoroplastics selected from the group consisting of polytetrafluoroethylene (PTFE), fluorinated ethylenepropylene copolymers (FEP), perfluorovinylalkylether tetrafluoroethylene copolymers, poly perfluoro(methyl vinyl ether) copolymer resin (PMVE), perfluoro(ethyl vinyl ether) copolymer resin (PEVE), and the like.

12. The fuser member of claim 1 further comprising:
   a compliant layer disposed over the substrate, the compliant layer comprising a material selected from a group consisting of a silicone, a fluorosilicone, and a fluoroelastomer; and
   the top coat layer comprising the hyper nanocomposite disposed over the compliant layer.

13. The fuser member of claim 1, wherein the substrate has a shape selected from the group consisting of a cylinder and a belt.

14. A printing apparatus comprising the fuser ember of claim 1, wherein the fuser member is selected from the group consisting of a fuser roll, a fuser belt, a pressure roll, a pressure belt, and a pressure pad.

15. An apparatus for forming an image comprising:
a charging station for uniformly charging a surface of an electrophotographic photoreceptor;
an imaging station for forming latent image on the electrophotographic photoreceptor;
a developing station for converting the latent image to a toner image on the electrophotographic photoreceptor;
a fuser subsystem for fixing the toner image onto a media, wherein the fuser subsystem comprises a hyper nanocomposite coating disposed over a substrate, the hyper nanocomposite coating comprising a plurality of nanoparticles substantially uniformly dispersed in one or more cross-linked hyperbranched polymers selected from the group consisting of polycarbosilane, polycarbosilixane, polycarbosilazene, and polyfluorocarbon, and wherein the hyper nanocomposite has a surface energy in the range of about 13 dyne/cm to about 20 dyne/cm.

16. The apparatus for forming an image of claim 15, wherein the plurality of nanoparticles comprises a plurality of one or more of single wall carbon nanotubes, multi-wall carbon nanotubes, graphene, carbon, aluminum oxide, aluminum nitride, silicon dioxide, silicon carbide, silicon nitride and copper.

17. The apparatus for forming an image of claim 15, wherein the plurality of nanoparticles are present in an amount ranging from about 0.5% to about 50% by weight of the total solid weight of the hyper nanocomposite.

18. The apparatus for forming an image of claim 15, wherein the hyper nanocomposite further comprises one or more additives selected from the group consisting of electrically conductive fillers, thermally conductive fillers, thermally stabilizing agents, coloring agents, reinforcing fillers, surfactants, cross-linking agents, leveling agents, and processing aids.

19. The apparatus for forming an image of claim 15, wherein the hyper nanocomposite further comprises one or more fluoroplastics selected from the group consisting of polytetrafluoroethylene (PTFE), fluorinated ethylenepropylene copolymers (FEP), perfluorovinylalkylether tetrafluoroethylene copolymers, polyfluoroalkoxypolytetrafluoroethylene, perfluoro(methyl vinyl ether) copolymer resin (PMVE), perfluoro(ethyl vinyl ether) copolymer resin (PEVE), and the like.

20. The apparatus for forming an image of claim 15, wherein the fuser subsystem is selected from the group consisting of an oil-less fuser subsystem and a low-oil fuser subsystem.

\* \* \* \* \*